United States Patent
Peloquin et al.

(10) Patent No.: US 6,715,070 B1
(45) Date of Patent: Mar. 30, 2004

(54) SYSTEM AND METHOD FOR SELECTIVELY ENABLING AND DISABLING PLUG-INS FEATURES IN A LOGICAL VOLUME MANAGEMENT ENVIORNMENT

(75) Inventors: Mark A. Peloquin, Austin, TX (US); Benedict Michael Rafanello, Round Rock, TX (US); Cuong Huu Tran, Austin, TX (US); Cristi Nesbitt Ullmann, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 582 days.

(21) Appl. No.: 09/687,113

(22) Filed: Oct. 12, 2000

(51) Int. Cl.[7] ................................................. G06F 9/00
(52) U.S. Cl. ................................. 713/1; 713/2; 711/173; 707/200; 707/201; 707/202; 707/203; 707/204; 707/205
(58) Field of Search .......................... 713/1, 2; 711/173; 707/200–205

(56) References Cited

U.S. PATENT DOCUMENTS

| | | | | |
|---|---|---|---|---|
| 5,371,848 A | * | 12/1994 | Casey et al. ................. 345/823 |
| 5,454,110 A | * | 9/1995 | Kannan et al. ................. 713/2 |
| 5,564,040 A | * | 10/1996 | Kubala ........................ 711/173 |
| 5,758,050 A | * | 5/1998 | Brady et al. .................... 714/1 |
| 5,897,661 A | | 4/1999 | Baranovsky et al. ........ 711/140 |
| 5,999,930 A | | 12/1999 | Wolff .............................. 707/8 |
| 6,324,588 B1 | * | 11/2001 | Desruisseaux et al. ...... 709/313 |
| 6,401,183 B1 | * | 6/2002 | Rafizadeh .................... 711/173 |
| 6,446,203 B1 | * | 9/2002 | Aguilar et al. .................. 713/2 |
| 6,523,047 B1 | * | 2/2003 | Rafanello et al. ........... 707/200 |
| 6,574,578 B1 | * | 6/2003 | Logan ......................... 702/122 |
| 6,591,356 B2 | * | 7/2003 | McMurdie et al. ......... 711/206 |
| 2003/0023826 A1 | * | 1/2003 | Michael et al. ............. 711/173 |

* cited by examiner

Primary Examiner—Thomas Lee
Assistant Examiner—Nitin C. Patel
(74) Attorney, Agent, or Firm—Duke W. Yee; David A. Mims, Jr.; Wayne P. Bailey

(57) ABSTRACT

A method and an apparatus for enabling and disabling features in a logical volume management environment is presented. This operation can be performed at boot time or at run time. The user is shown a list of features as well as the current state for each feature. If the feature is currently enabled, the user can select to disable the feature, provided this is a safe operation given the current features for the volume. If the feature is disabled, the user has the following choices: re-enable, disable and retain in the feature stack, disable and remove from the feature stack, and permanently remove the disabled feature from the volume. Disabling or re-enabling features can be very useful to accommodate a changing operating environment. For example, the feature Volume Mirroring allows a replication of the volume at a remote site. If due to network difficulties that remote site becomes inaccessible, then this feature would have to be disabled. At a later time when the site becomes accessible again, the feature can be re-enabled.

15 Claims, 4 Drawing Sheets

SYSTEM AND METHOD FOR SELECTIVELY ENABLING AND DISABLING PLUG-INS FEATURES IN A LOGICAL VOLUME MANAGEMENT ENVIORNMENT

BACKGROUND OF THE INVENTION

1. Technical Field

The present invention relates generally to an improved method to manage logical volumes and, in particular, to a method and an apparatus for selecting features in a logical volume management environment. Still more particularly, the present invention provides a method and an apparatus to allow the user at boot time or at run time to select the features that should be enabled during the computer session.

2. Description of the Related Art

The Logical Volume Management System (LVMS) is a subsystem for on-line disk storage management that adds an additional layer between the device drivers and the block I/O interface in the kernel of the operating system to allow a logical view on storage. For systems without an LVMS, each of the partitions that is usable by the operating system is assigned a drive letter, such as "C:" or "F:", producing a correlating drive letter for each partition on a disk in the computer system. The process which assigns these letters is commonly known. For systems with an LVMS, a drive letter may be mapped instead to a logical volume which may contain one or more partitions. The process by which partitions are combined into a single entity is known generically as "aggregation."

One of the unique features of this LVMS is the ability to accept plug-in modules. A plug-in module consists of executable code which can be loaded and run by the LVMS. Plug-in modules allow the capabilities of the LVMS to be expanded without having to alter the code of the LVMS itself. This simplifies development and maintenance while increasing the stability of the LVMS over time. The new capability provided by a plug-in module is also referred as feature. Note that the terms "feature" and "plug-in" are used interchangeably herein. An example of a feature would be non-local mirroring, whereby the contents of a volume are mirrored to a volume on another machine.

Features are plug-in components used by the LVMS to control how input/output (I/O) is performed to the partitions that comprise a logical volume. The input to a feature is the same in format and structure as the output from a feature. This allows the output from one feature to be used as the input to another, which, in turn, allows features to be stacked. Thus, multiple features may be applied to a volume. Every time the system boots, a feature stack will be constructed for each of the volumes in the system.

By default, when a volume is constructed, all features will be enabled and placed in the feature stack. Sometimes a feature will not be used and can be safely disabled. Therefore, it would be advantageous to have a method and an apparatus to allow the user to specify at boot time what features are to enabled in the logical volume management system.

SUMMARY OF THE INVENTION

A method and an apparatus for enabling and disabling features in a logical volume management environment is presented. This operation can be performed at boot time or at run time. The user is shown a list of features as well as the current state for each feature. If the feature is currently enabled, the user can select to disable the feature, provided this is a safe operation given the current features for the volume. If the feature is disabled, the user has the following choices: re-enable, disable and retain in the feature stack, disable and remove from the feature stack, and permanently remove the disabled feature from the volume.

Disabling or re-enabling features can be very useful to accommodate a changing operating environment. For example, the feature Volume Mirroring allows a replication of the volume at a remote site. If due to network difficulties that remote site becomes inaccessible, then this feature would have to be disabled. At a later time when the remote site becomes accessible again, the feature can be re-enabled.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
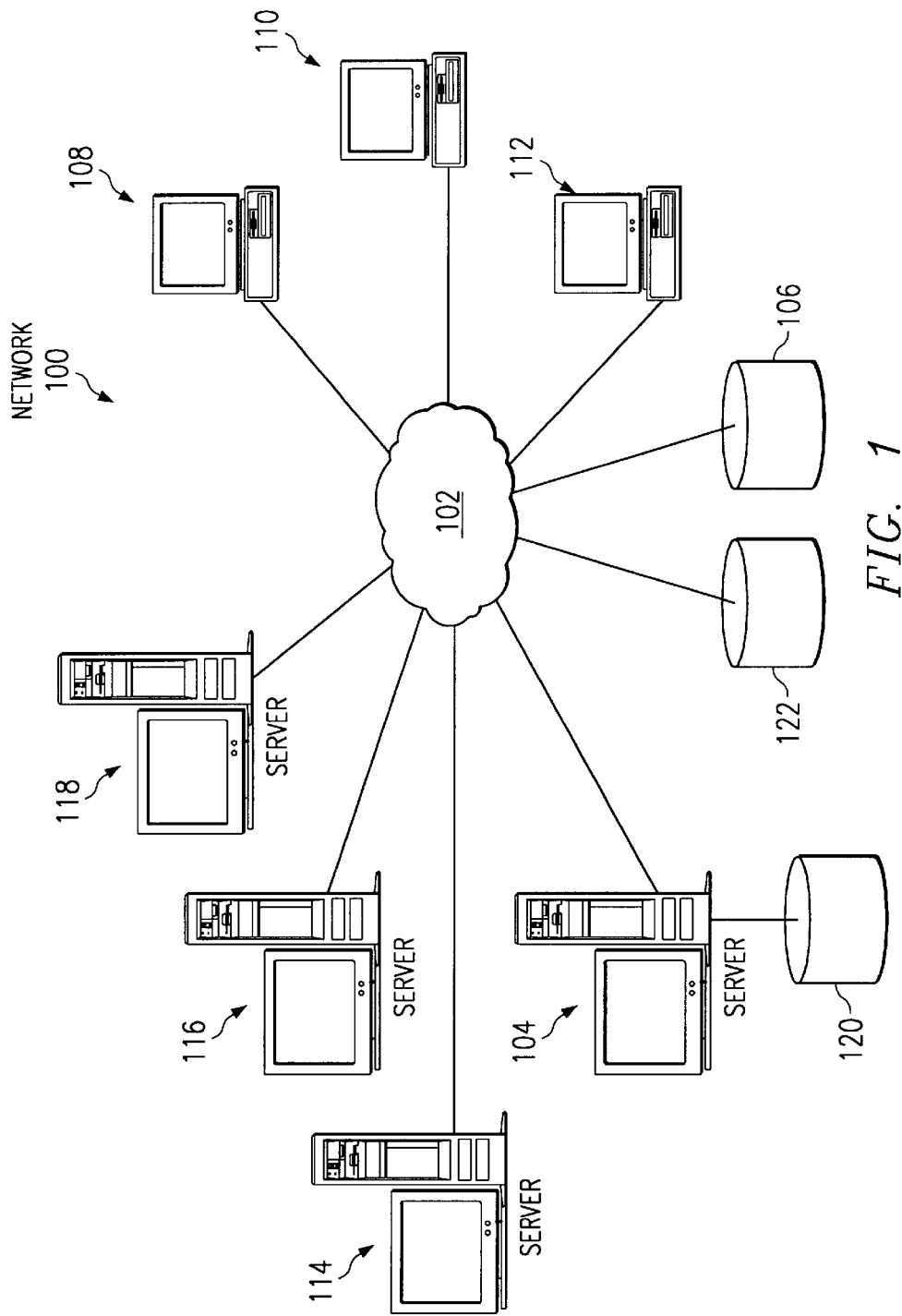
FIG. 1 is a pictorial representation of a distributed data processing system in which the present invention may be implemented.

With reference now to the figures, and in particular with reference to FIG. 1, a pictorial representation of a distributed data processing system is depicted in which the present invention may be implemented.

Distributed data processing system 100 is a network of computers. Distributed data processing system 100 contains network 102, which is the medium used to provide communications links between various devices and computers connected within distributed data processing system 100. Network 102 may include permanent connections, such as wire or fiber-optic cables, or temporary connections made through telephone connections.

In the depicted example, servers 104, 114, 116 and 118 are connected to network 102. Storage units 106 and 122 are also connected to network 102, providing backup support for any or all of servers 104, 114, 116 and 118. Storage unit 122 provides dedicated backup support for server 104. In addition, clients 108, 110 and 112 are also connected to network 102. These three clients may be, for example, personal computers or network computers. For purposes of this application, a network computer is any computer coupled to a network, which receives a program or other application from another computer coupled to the network. Distributed data processing system 100 may include additional servers, clients, and other devices not shown.

In the depicted example, servers 104, 114, 116 and 118 provide storage for data from clients 108, 110 and 112. These four servers also provide data, such as boot files, operating system images, and applications to clients 108, 110 and 112. Clients 108, 110 and 112 are clients to one or all of servers 104, 114, 116 and 118. Support for a particular application being performed on one of clients 108, 110 and 112 may be by one of servers 104, 114, 116 and 118. Additionally servers 104, 114, 116 and 118 may provide backup support for each other. In the event of a server failure, a redundant backup server may be allocated by the network administrator, in which case requests directed to the failed server are routed to the redundant backup server.

In a similar manner, data backup support is provided by storage units 106 and 122 for servers 104, 114, 116 and 118. However, rather than the network administrator allocating a data backup storage unit at each use, data backup allocation is set, and data backup transfer occurs at low usage times, typically after midnight, between any of servers 104, 114, 116 and 118 and storage units 106 and 122.

In the depicted example, distributed data processing system 100 may be the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks, such as, for example, an intranet or a local area network.

FIG. 1 is intended as an example and not as an architectural limitation for the processes of the present invention. The present invention may be implemented either on server machines, such as server 104, or client machines, such as client 108.

Figure 2:
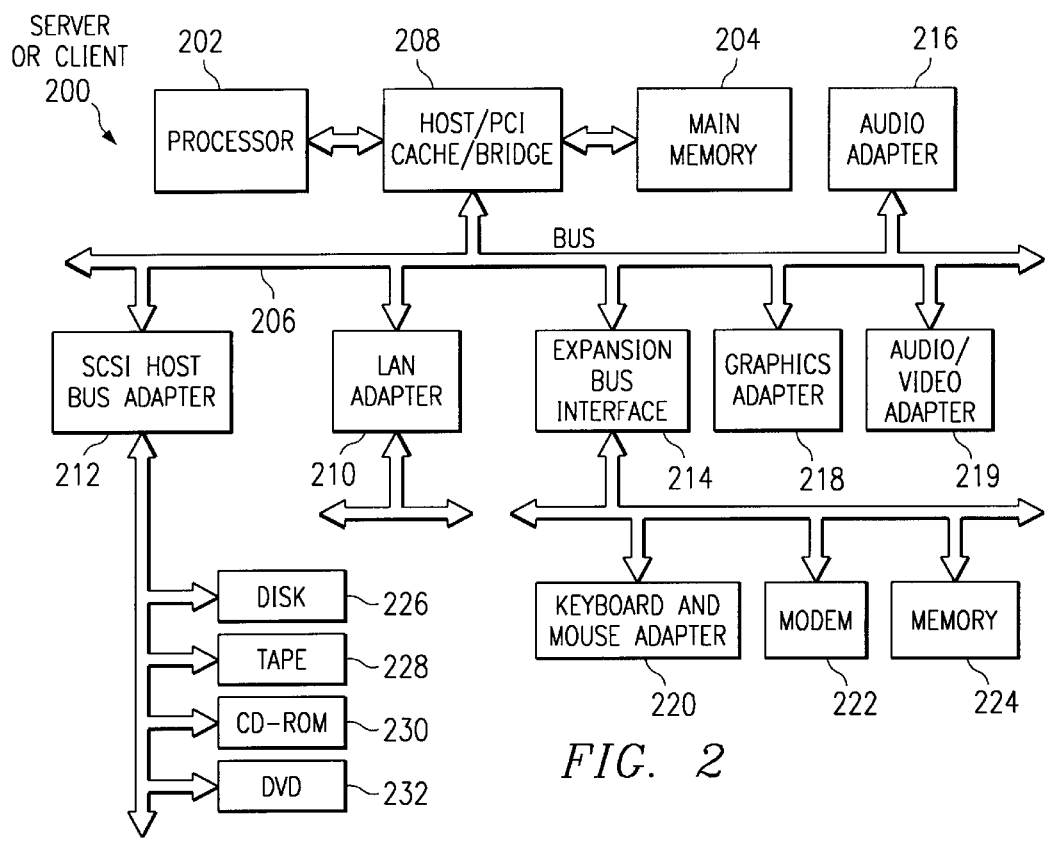
FIG. 2 is a block diagram of a data processing system that may be implemented as a server or a client in which the present invention may be implemented.

With reference now to FIG. 2, a block diagram of a data processing system in which the present invention may be implemented is illustrated. Data processing system 200 could be used either as a server or as a client computer. Data processing system 200 employs a peripheral component interconnect (PCI) local bus architecture. Although the depicted example employs a PCI bus, other bus architectures, such as Micro Channel and ISA, may be used.

Processor 202 and main memory 204 are connected to PCI local bus 206 through PCI bridge 208. PCI bridge 208 may also include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter (A/V) 219 are connected to PCI local bus 206 by add-in boards inserted into expansion slots.

Expansion bus interface 214 provides a connection for a keyboard and mouse adapter 220, modem 222, and additional memory 224. In the depicted example, SCSI host bus adapter 212 provides a connection for hard disk drive 226, tape drive 228, CD-ROM drive 230, and digital video disc read only memory drive (DVD-ROM) 232. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system, such as OS/2, which is available from International Business Machines Corporation. "OS/2" is a trademark of International Business Machines Corporation.

Those of ordinary skill in the art will appreciate that the hardware in FIG. 2 may vary depending on the implementation. For example, other peripheral devices, such as optical disk drives and the like, may be used in addition to or in place of the hardware depicted in FIG. 2. The depicted example is not meant to imply architectural limitations with respect to the present invention. For example, the processes of the present invention may be applied to multiprocessor data processing systems.

As mentioned in the background of the invention section, at boot time when each of the volumes is reconstructed, all available features associated with the volume are included to form the feature stack. However, changes in system configuration or run time conditions may lead to difficulties, as illustrated below.

A logical volume may include volume mirroring, which means that a duplicate of the logical volume is maintained elsewhere. For the best security this is usually a remote site connected by a network, so that even if the logical volume at the local site is damaged or inaccessible, then the remote site is still available. Suppose the local logical volume manager attempts to boot up with mirroring enabled to the remote site, but, due to network problems, the remote site is currently not available. In this case, the boot of the local logical volume manager would not be successful. In order to continue operation, at least locally, it would be necessary to disable mirroring until access to the mirror site can be restored. This is one example of where selective disabling of features would be desirable.

The invention is preferably realized using a well-known computing platform, such as an IBM personal computer, running the IBM OS/2 operating system. A generic computer platform was described in FIG. 2. However, it may be realized in other popular computer system platforms, such as a Sun Microsystems workstation or IBM RS/6000 workstation, running alternate operating systems such as Microsoft Windows, HP-UX, UNIX or LINUX, without departing from the spirit and scope of the invention.

Figure 3:
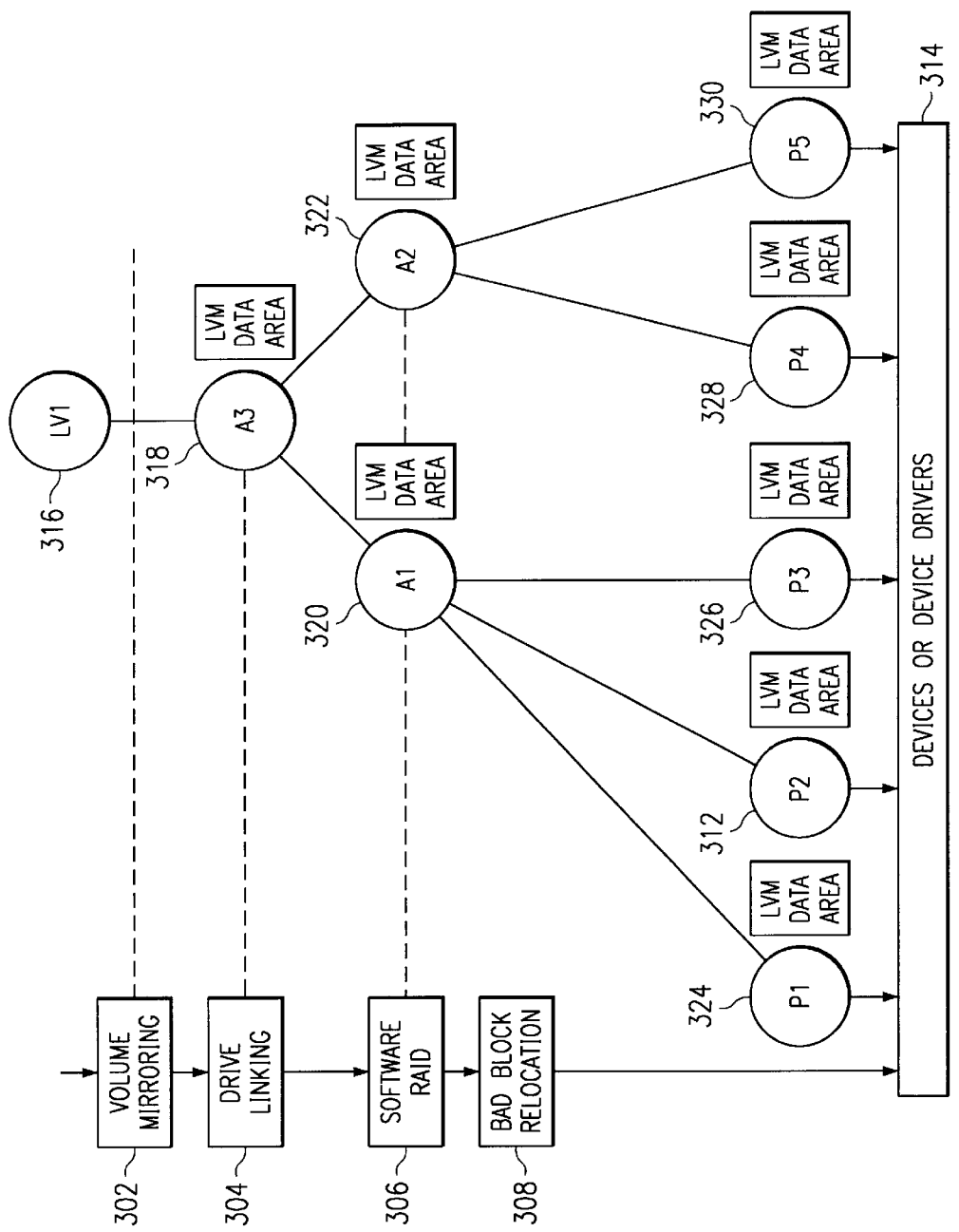
FIG. 3 depicts the relationship between a feature stack model and a tree model of a multi-layer LVM in accordance with the present invention.

FIG. 3 shows, by way of example, the correlation between the feature stack model and the tree model of a logical volume. On the left, the "feature stack" is shown interfacing to the device drivers 314. The lowest level feature is Bad Block Relocation 308 ("BBRf"). A "bad block" on a storage device is a sector that has been damaged. It is necessary to move data from the bad block to another location whereby all references to the bad block are redirected to the new location.

Software RAID 306 and Drive Linking 304 appear in the middle of the feature stack. RAID (Redundant Array of Independent Disks) software provides fault tolerance for data storage where lost data can be recovered based on the remaining data. Drive Linking provides a mechanism for aggregating partitions that may be located on independent storage devices into a single logical entity.

At the top of the feature stack is Volume Mirroring 302. Volume Mirroring refers to replicating an entire volume on an independent storage device. From the view of the feature stack model, an I/O request is received at the top of the stack and propagated downwards to the Device Drivers 314. As one of ordinary skill in the art will appreciate, the features 302, 304, 306, and 308 are for illustrative purposes only and a wide variety of alternative features are processed in the same way.

The corresponding tree model is shown to the right of the feature stack model. Logical volume LV1 316 is at the root of the tree. The volume contains aggregates A3 318, A1 320 and A2 322. The aggregate A3 is the top most aggregate containing the aggregates A1 and A2. An aggregate can be grouped by either multiple partitions, as is the case for A1 and A2, or multiple aggregates, as is the case for A3.

Allowing aggregation of aggregates and associating them with features in the feature stack can help overcome some system limitations. For example, many RAID systems limit the number of partitions for an aggregate. However by allowing disk linking of RAID aggregates, as shown in FIG. 3, this software limitation can effectively be overcome.

Each of the aggregates A1 and A2 contains multiple partitions. Specifically, A1 320 is an aggregator for partitions P1 324, P2 312, and P3 326 and A2 322 is an aggregator for P4 328 and P5 330. These partitions are subject to the Bad Block Relocation 310. All of the aggragates and partitions have an associated LVM Data Area. These types of LVM structures, feature stack models, and tree models are well understood in the art, and the models can be equally applied to the logical volume management systems in other operating systems such as Hewlett Packard's UP-UX and IBM's AIX.

To provide storage for itself and any features used on the partitions, the LVM creates an area of contiguous disk space at the end of the partition called the LVM Data Area. The size of the LVM Data Area is based upon the needs of the LVMs and the features applied to the partition. This means that the LVM Data Area on different logical partitions may be of different sizes, even if the logical partitions are all part of the same logical volume.

The last sector in the LVM Data Area is called the LVM Signature Sector, and it maps the contents of the partition's LVM Data Area. The LVM Signature Sector contains a table which identifies which features have been applied to the partition, the order in which they are applied, and the location of the private data for each feature. Every partition in a volume contains an LVM Data Area and an LVM Signature Sector.

Aggregates, which appear as partitions, have LVM Data Areas also. The LVM Data Area for an aggregate is treated just like the LVM Data Area for a partition. It is made up of contiguous disk space at the very end of the aggregate, with the LVM Signature Sector being the last sector of the aggregate. The LVM Data Area of an aggregate tracks those features which were applied to the aggregate.

The enable/disable capability is implemented by having an additional Feature Enable flag in the LVM Data Area of the partition or the aggregate on which the feature is being applied. There are two states for the Feature Enable flag: SET (1) or RESET (0). As long as the Feature Enable flag is SET, the feature will continue performing its function. For Volume Mirroring feature in the sample volume, it will continue mirroring to the other machine on the network.

Figure 4A:
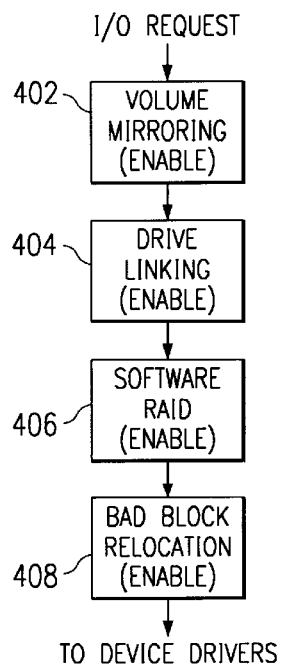
FIG. 4A depicts the feature stack at runtime when all features are enabled in accordance with the present invention.

FIG. 4A illustrates the I/O request path if all features are enabled. The I/O request enters at the top of the feature stack, Volume Mirroring 402. It is passed down through the features of Drive Linking 404, Software RAID 406, and Bad Block Relocation 408 before reaching to the device drivers.

When Feature Enable flag is RESET, there are two possible scenarios. The first scenario is when a feature is disabled, but it remains in the feature stack of the volume. The second scenarios is when a feature is disabled and removed from the feature stack.

Figure 4B:
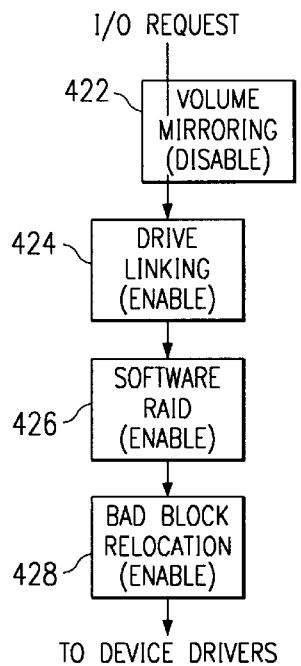
FIG. 4B depicts the feature are stack at runtime when selected features are disabled in accordance with the present invention.

FIG. 4B illustrates the I/O request path if Volume Mirroring has been disabled and left in the feature stack. This allows Volume Mirroring plugin module to keep track of I/O requests. However, I/O request packets should be unchanged and passed down to the next feature as long as Volume Mirroring remains disabled. The benefit of this design is that the feature is allowed to re-enable itself during run time. In the case of Volume Mirroring, when the remote site becomes accessible again, it can resume mirroring the volume to the remote machine.

Figure 4C:
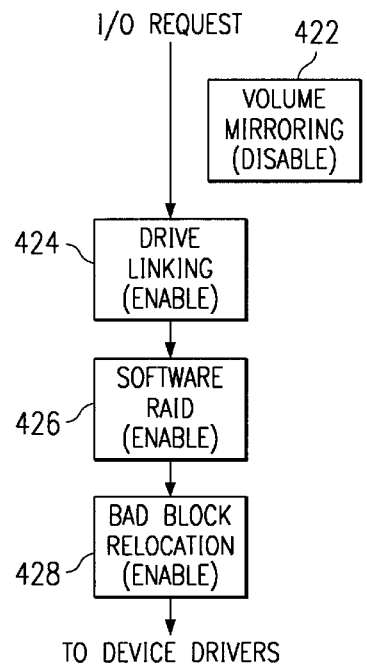
FIG. 4C depicts the feature stack at runtime when Volume Mirroring has been disabled and removed from the feature stack in accordance with the present invention.

FIG. 4C illustrates the I/O request path if Volume Mirroring has been disabled and removed from the feature stack. Since Volume Mirroring has been disabled, I/O request enters at Drive Linking 424, Software RAID 426, and Bad Block Relocation 428, respectively. The I/O request is then sent to the device drivers.

Not all features can be safely disabled without damaging a volume. In the sample volume shown in FIG. 3, Volume Mirroring can be safely disabled, whereas Bad Block Relocation cannot. Therefore, the plug-in module for each of the features should be programmatically consulted during run time. This is accomplished through a defined function call that must be implemented by all features to be called by the LVM program. The following is an example for such a function call: BOOLEAN CanBeDisabled(void). This function returns TRUE (1) if this feature can be safely disabled and returns FALSE (0) if the function cannot be disabled.

Figure 5A:
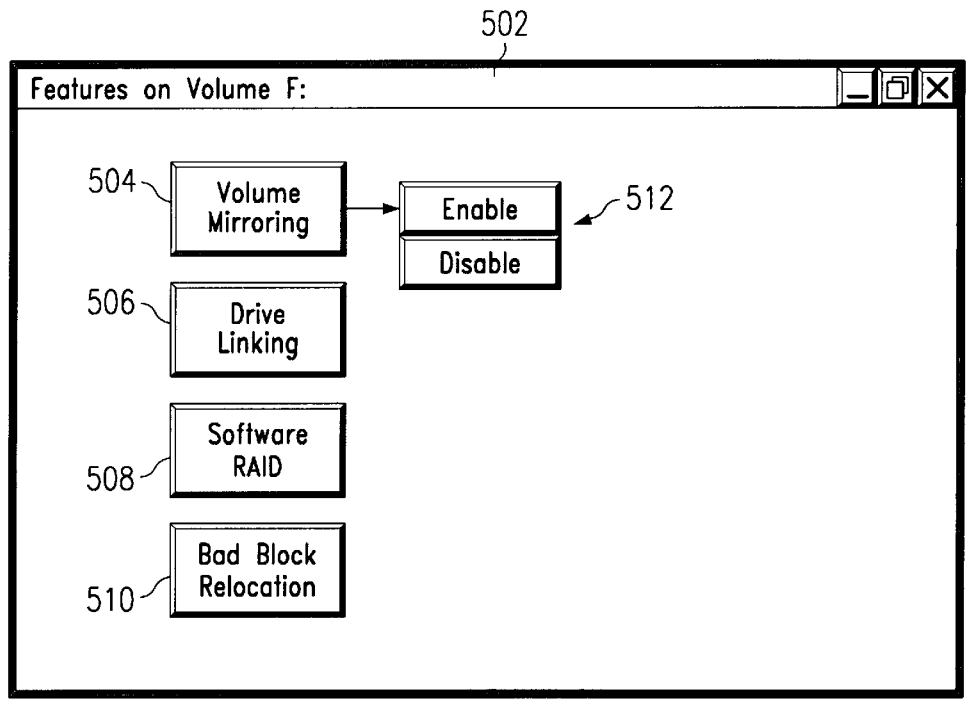
FIG. 5A shows a user interface displayed at boot time for selectively enabling and disabling features in accordance with the present invention.

FIG. 5A shows a sample user interface that allows a user to selectively enable or disable features during run time. The logical volume identification 502 is shown at the top of the screen. The current list of possible features are shown at the left in the same order as the feature stack. The features Volume Mirroring 504, Drive Linking 506, Software RAID 508, and Bad Block Relocation 510 correspond to the feature stack shown in FIG. 3.

The features shown in FIG. 5A are currently enabled. When the user clicks the mouse on Volume Mirroring 504, an option list 512 appears with the options Enable and Disable. If the user selects Disable, then, as we will see in the next feature figure, the Volume Mirroring button will be labeled Disabled. For features that cannot be safely disabled, the user will not be allowed to change the state of those features.

Figure 5B:
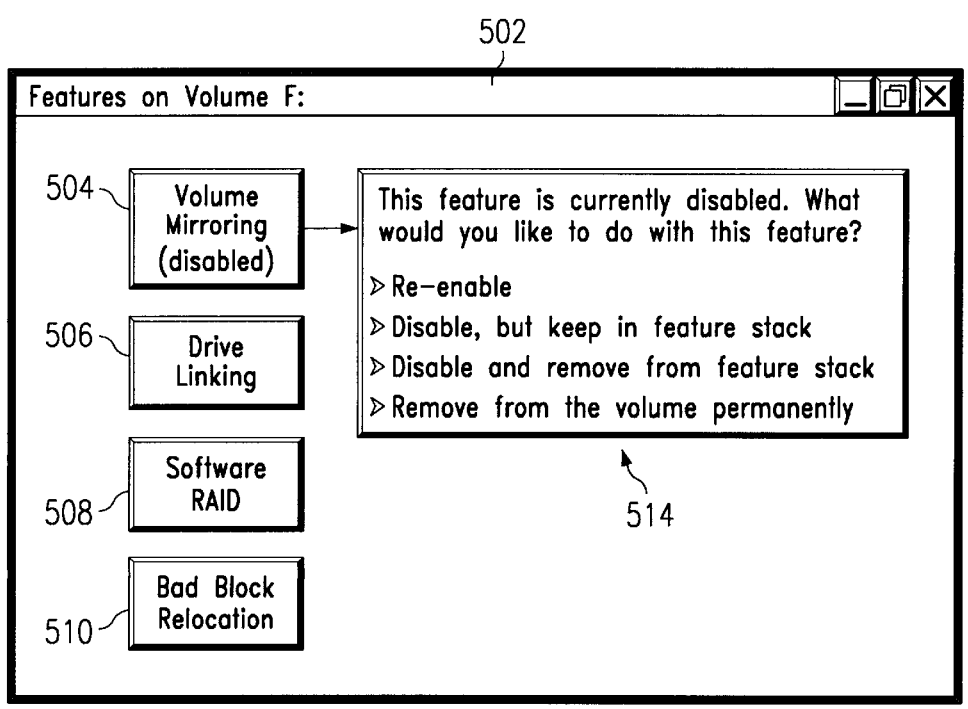
FIG. 5B shows a user interface for a disabled feature in accordance with the present invention.

At boot time, when an LVM volume is being re-created, if the Feature Enable flag of one or more features is in disabled state, a user interface should be launched to notify the user and ask for the user's decision. In FIG. 5B the Volume Mirroring feature 504 is in a disabled state. When the user clicks on a disabled feature, a menu of choices 514 appears. The used user can select to re-enable the feature, disable the feature but keep it in the feature stack, disable the feature and remove it from the feature stack, or remove the feature from the volume permanently. If the latter is chosen, then feature 504 would be removed from the list of features.

As one of ordinary skill in the art will appreciate, a wide variety of user interfaces can be designed that allows the user to enable or disable features selectively. The user interface shown in FIGS. 5A and 5B is for illustrative purposes only.

The description of the present invention has been presented for purposes of illustration and description but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

What is claimed:

1. A method in a data processing system for enabling and disabling features in a logical volume management environment, the method comprising the steps of:

providing an interface displaying list of logical volume features in a feature stack and a current state for each logical volume feature, wherein the logical volume features are plug-ins for use by the logical volume management environment to perform actions using a defined logical volume while maintaining current physical configuration of the defined logical volume;

receiving a selection to disable a feature that is currently enabled; and receiving a selection to change a state of a feature that is currently disabled.

2. The method of claim 1, wherein if it is unsafe to disable a logical volume feature, the operation is not allowed.

3. The method of claim 1, wherein enabling and disabling logical volume features is performed at boot time and at run time.

4. The method of claim 1, wherein the selection to change the state of logical volume feature that is currently disabled is one of selected from the following choices which are presentable by the interface: re-enable, disable and retain in the feature stack, disable and remove from the feature stack, and permanently remove the disabled feature from the logical volume.

5. The method of claim 1, wherein an input/output request is received at the top of the feature stack and propagated down the feature stack to a set of device drivers below the bottom of the feature stack, wherein the feature stack comprises features that are enabled and features that are disabled and retained, and wherein the feature stack is void of any features that are disabled and removed.

6. An apparatus in a data processing system for enabling and disabling features in a logical volume management environment, the apparatus comprising:

a displaying means for providing an interface displaying a list of logical volume features in a feature stack and current state of each feature, wherein the logical volume features are plug-ins for use by the logical volume management environment to perform actions using a defined logical volume while maintaining current physical configuration of the defined logical volume;

an inputting means for receiving a selection to disable a logical volume feature that is currently enabled; and an inputting means for receiving a selection to change a state of a feature that is currently disabled.

7. The apparatus of claim 6, wherein if the inputting means receives a selection to disable a logical volume feature that cannot safely be disabled, then the operation is not allowed.

8. The apparatus of claim 6, wherein the inputting means for enabling and disabling logical volume features is performed at boot time and at run time.

9. The apparatus of claim 6, wherein the inputting means for the selection to change the state of a logical volume feature that is currently disabled is selected form the following choices which are presentable by the interface: re-enable, disable and retain in the feature stack, disable and remove form the feature stack, and permanently remove the disabled feature form the logical volume.

10. The apparatus of claim 6, wherein a propagating means for an input/output request received at the top of the feature stack propagates the request down the feature stack to a set of device drivers below the bottom of the feature stack, wherein the feature stack comprises features that are enabled and features that are disabled and retained, and wherein the feature stack is void of any features that are disabled and removed.

11. A computer program product in a data processing system for enabling and disabling features in a logical volume management environment, the computer program product comprising:

instructions for displaying a list of logical volume features in a feature stack and a current state for each feature, wherein the logical volume features are plug-ins for use by the logical volume management environment to perform actions using a defined logical volume while maintaining current physical configuration of the defined logical volume;

instructions of receiving a selection to disable a logical volume feature that is currently enabled; and instructions for receiving a selection to change a state of a feature that is currently disabled.

12. The computer program product of claim 11, wherein if it is unsafe to disable a logical volume feature, the instruction for disabling the feature are not performed.

13. The computer program product of claim 11, wherein instructions for enabling and disabling logical volume features are executed at boot time and at run time.

14. The computer program product of claim 11, wherein the instructions for selection to change the state of a logical volume feature that is currently disabled is one of selected form the following choices which are presentable by the interface: re-enable, disable and retain in the feature stack, disable and remove from the feature stack, and permanently remove the disabled feature from the logical volume.

15. The computer program product of claim 11, wherein instructions for processing an input/output request is received at the top of the feature stack and propagated down the feature stack to a set of device drivers below the bottom of the feature stack, herein the feature stack comprises features that are enabled and features that are disabled and retained, and wherein the feature stack is void of any features that are disabled and removed.

\* \* \* \* \*

UNITED STATES PATENT AND TRADEMARK OFFICE
CERTIFICATE OF CORRECTION

PATENT NO. : 6,715,070 B1
APPLICATION NO. : 09/687113
DATED : March 30, 2004
INVENTOR(S) : Peloquin et al.

It is certified that error appears in the above-identified patent and that said Letters Patent is hereby corrected as shown below:

Col. 7, line 36: after "is" delete "one of".

Col. 8, line 34: after "instructions" delete "of" and insert --for--.

Col. 8, line 46: after "disabled is" delete "one of".

Col. 8, line 55: after "of the featured stack" delete "herein" and insert --wherein--.

Signed and Sealed this

Eighth Day of August, 2006

JON W. DUDAS
*Director of the United States Patent and Trademark Office*

UNITED STATES PATENT AND TRADEMARK OFFICE
CERTIFICATE OF CORRECTION

PATENT NO. : 6,715,070 B1  Page 1 of 1
APPLICATION NO. : 09/687113
DATED : March 30, 2004
INVENTOR(S) : Peloquin et al.

It is certified that error appears in the above-identified patent and that said Letters Patent is hereby corrected as shown below:

(54) Title, line 4: after "MANAGEMENT" delete "ENVIORNMENT" and insert --ENVIRONMENT--.

Col. 1, line 4: after "MANAGEMENT" delete "ENVIORNMENT" and insert --ENVIRONMENT--

Col. 2, line 36; after "feature" delete "are".

Col. 7, line 18: after "displaying" insert --a--.

Col. 7, line 53: before "each" delete "Curent state of" and insert --a current state for--.

Col. 8, line 10: after "selected" delete "form" and insert --from--.

Col. 8, line 13: after "remove" delete "form" and insert --from--.

Col. 8, line 14: after "feature" delete "form" and insert --from--.

Col. 8, line 47: before "the following" delete "form" and insert --from--.

Signed and Sealed this

Fifth Day of December, 2006

JON W. DUDAS
*Director of the United States Patent and Trademark Office*